United States Patent [19]

Ferrari

[11] 4,212,092
[45] Jul. 15, 1980

[54] CASTOR-WHEEL FOR ARMCHAIRS AND THE LIKE

[75] Inventor: Franco Ferrari, Lecco, Italy

[73] Assignee: Agostino Ferrari & C.S.n.C, Lecco, Italy

[21] Appl. No.: 942,372

[22] Filed: Sep. 14, 1978

[30] Foreign Application Priority Data

Nov. 3, 1977 [IT] Italy .................................. 29322 A/77

[51] Int. Cl.² ............................................. B60B 33/00
[52] U.S. Cl. ................................... 16/35 R; 188/1 D
[58] Field of Search ................. 16/35 R, 49, DIG. 36; 188/1 D

[56] References Cited

U.S. PATENT DOCUMENTS

| 3,751,757 | 8/1973 | Stosberg et al. | 16/35 R |
| 3,914,821 | 10/1975 | Screen | 16/35 R |
| 4,110,866 | 9/1978 | Ishii | 188/1 D |
| 4,143,442 | 3/1979 | Harlang | 16/35 R |

FOREIGN PATENT DOCUMENTS

| 2334324 | 1/1975 | Fed. Rep. of Germany | 16/35 R |
| 2620662 | 11/1977 | Fed. Rep. of Germany | 16/35 R |
| 2656022 | 6/1978 | Fed. Rep. of Germany | 16/35 R |
| 2700494 | 7/1978 | Fed. Rep. of Germany | 16/35 R |
| 2365450 | 5/1978 | France | 16/35 R |

Primary Examiner—C. J. Husar
Assistant Examiner—Moshe I. Cohen
Attorney, Agent, or Firm—Charles E. Brown

[57] ABSTRACT

A castor wheel assembly for chairs and the like is disclosed in which the wheel axle and hub are permitted a limited vertical stroke in a slot, a vertically arranged spring being active against the peripheral surface of the axle so that, when the chair is unloaded, the springs of the wheels urge the latter down so that the hubs may engage a friction surface. When the user seats on the chair, the springs are compressed and the rotation of the wheels is unhindered. The total force of the springs in a chair shall overcome the chair's own weight.

6 Claims, 6 Drawing Figures

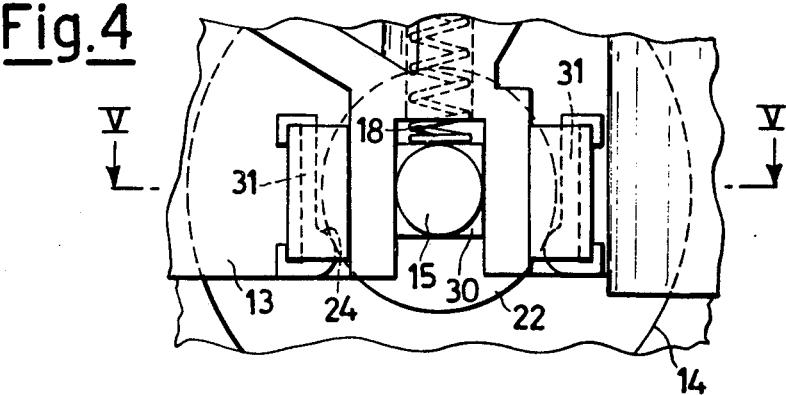
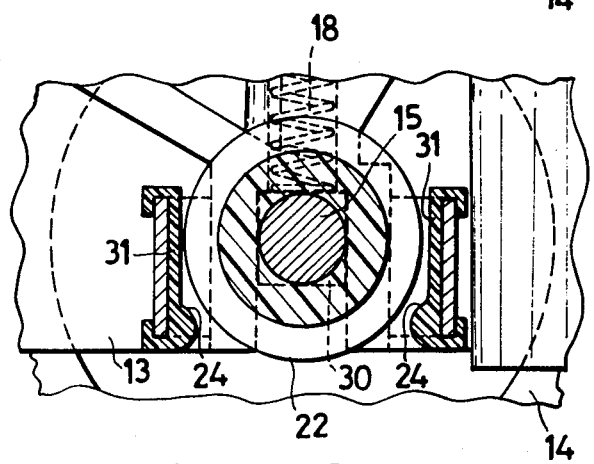
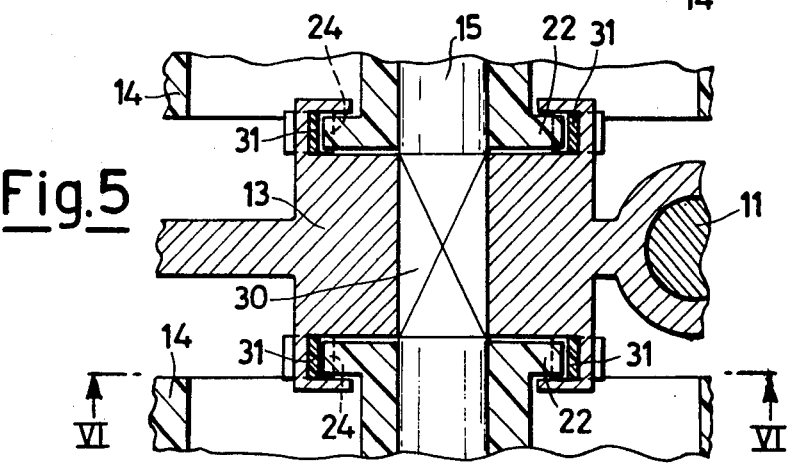

CASTOR-WHEEL FOR ARMCHAIRS AND THE LIKE

It is known to apply to the legs of chairs or armchairs castor-wheels, that is wheel to be mounted rotatably about a vertical axle which is skew relative to the axle of rotation proper of the wheel.

An inherent advantage of such wheels is that they are very easily slid on a floor but this feature can become a trouble when the chair is unloaded as the exceedingly high mobility of the chair may be an inconvenience for the user.

The object of this invention is to provide a castor wheel having a differential sliding capability, that is to say, a chair which becomes braked when unloaded, the ease of assembly of such a wheel being compatible with a mass production of the wheels in question.

According to the invention, a castor wheel assembly is composed by a body portion having a vertical pin about which the assembly can be rotated for orienting a wheel, the body having a horizontally extending vertical slot which is skew relating to the pin axis and is adapted to receive a pivot axle movable in the vertical plane of the slot, the pivot axle carrying two wheel-halves each having a hub, each hub being housed, in its turn, within a tapered seating walls, a spring urging the pivot axle in the slot to move the wheel-halves to positions wherein their hub engage the tapered seating walls.

In order that the features and objects of the invention may be better understood, an exemplary embodiment of the assembly will be described in the ensuing disclosure and illustrated by the accompanying drawings, wherein:

FIG. 4 is a view similar to that of FIG. 1 and shows an alternative embodiment.

FIG. 5 is a cross-sectional view taken along the line V—V of FIG. 4, and

FIG. 6 is a cross-sectional view taken along the line VI—VI of FIG. 5.

Figure 1:
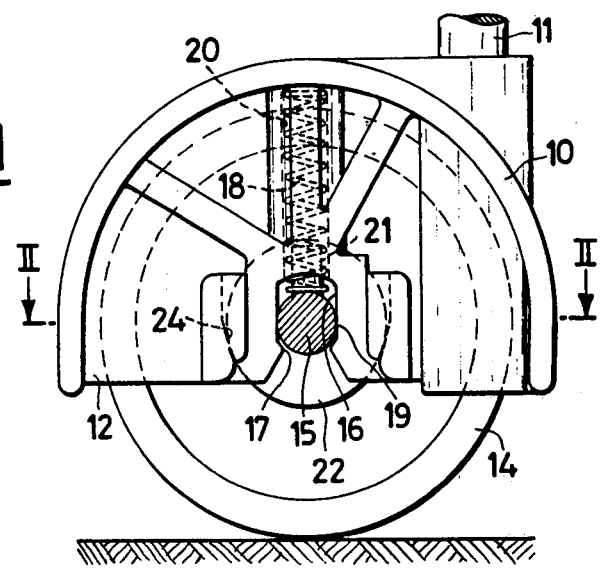
FIG. 1 shows a partial side elevational view of a wheel assembly.

Having now reference to FIGS. 1 to 3, the assembly comprises a body 10 intended to be rotatably mounted about the pin 11 on a leg of a chair and the like, in a manner which is wholly conventional so that no detailed description will be given. The body 10 has a substantially arcuate outline and has a central diaphragm 12 fitted with ribs and, integrally with the diaphragm 12, a journal 13 for two wheel-halves 14 is formed. The wheel-halves are idly rotatable about a stationary pivot axle 15. Characteristically, the pivot axle 15 is housed in a vertically movable manner within a slot 16 of the journal 13, into which the pivot axle is preferably snappingly inserted through a spout 17 having a width slightly smaller than the diameter of the pivot axle 15. A spring 18 urges the pivot axle 15 to the position of FIG. 1 in correspondence with a bevel 19 of the spout 17. The spring 18 is housed within a blind radial bore 20 of the diaphragm 12 and is inserted with either end about a stud 21 which is radially extended from the pivot axle 15.

In the down position of the pivot axle 15 as shown in FIG. 1, two braking discs 22 integral with the hubs of the respective wheel-halves 14 come into frictional contact with the relative couples of confronting tapered walls 24 which are formed laterally of the journal 13.

In operation, the sum of the forces of the springs 18 of the chair castor wheels exceeds the weight of the chair proper so that each spring, through the pivot axle 15, urges the braking discs against the walls 24. Under these circumstances, the rotation of the wheels is braked to such a degree as suffices to prevent too smooth a sliding of the chair over the floor, that which is a potential disturbance for the user who is about to take seat. However, as soon as the chair is loaded by the user's weight, the springs 18 are compressed so as to bring the body 10 approaching the floor so that the braking discs are brought away of the friction walls 24 to the position of FIG. 3.

It is thus apparent that in this position the wheels 14 are freely rotatable about the pivot axle 15 without any braking force interfering, so that the user is allowed to displace the chair conveniently with a minimum effort only.

The walls 24 have a certain yieldability so that the disc portions 22 can be inserted forcibly therebetween during the assembling operation, concurrently with the snap insertion of the pivot 15 as described above.

It will be seen that the angle of taper of the walls 24 will have an influence also on the braking force on the wheels for the same magnitude of the load of the spring 18, since for low values of the angle a possibility of wedging is actually initiated.

Of course the piece should be so sized that the expansion of the spring 18 brings the discs 22 into contact with the walls 24 prior to the engagement of the pivot axle 15 against the restricted portion 17 of the slot, if any is provided: the action of the retainment of the pivot in the slot prevents any accidental discontinuation of the engagement of the walls by the discs, for example during the motion of the unloaded chair.

The radial stud 21 is not strictly necessary for the operation of the brake but it has proven to be effective in preventing any undesired rotation of the pivot axle which would wear the seat of same and in centering the action of the spring 18 appropriately.

Figure 3:
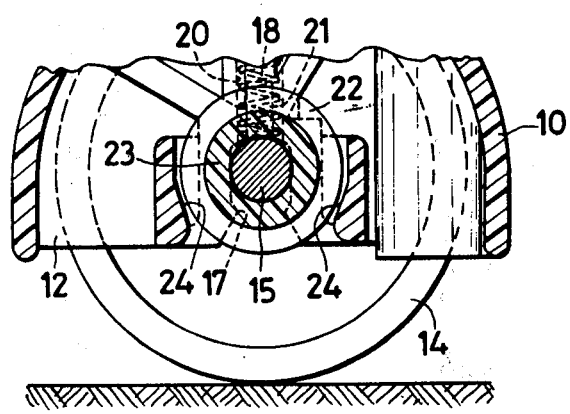
FIG. 3 is a cross-sectional view taken along the line III—III of FIG. 2.
Figure 2:
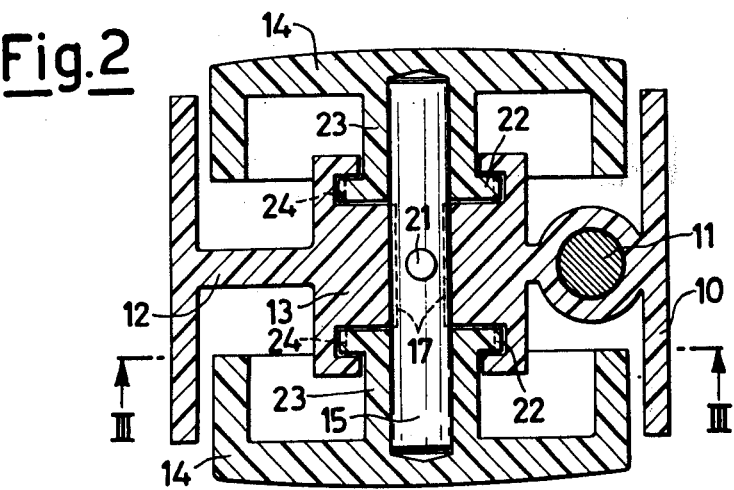
FIG. 2 is a cross-sectional view taken along the line II—II of FIG. 1.

An alternative embodiment is shown in FIGS. 4-6, similar to FIGS. 1-3. Parts of the device shown in these Figures which are similar to parts which have already been described are indicated with like reference numerals.

In such alternative embodiment the pivot axle 15 has a central zone 30 having a prismatic cross-section, so that it is vertically movable but cannot be rotated. This makes the presence of the pin 21 shown in FIGS. 1-3 unnecessary.

In addition it can be seen that the frictional surfaces intended for braking have, in this embodiment the form of inserts 31 which define the braking surfaces 24. Thus they can be made of the material which is most suitable to their specific function irrespective of the material of which the body 13 of the device is made.

More particularly, when the latter body is of a stiff material such as a metal, the inserts 31 can have the yieldability which is required for forcibly inserting the discs 22 as the device is being assembled.

While a possible embodiment of the invention has been shown and described herein, it will be understood that modifications and changes can be introduced therein without departing from the scope of this invention as defined in and by the appended claims.

I claim:

1. A castor wheel assembly, for chairs, said castor wheel assembly being characterized in that it comprises a body having a horizontally extending slot, said slot having a vertical extent, a pivot axle mounted within said slot for limited vertical movement, a pair of wheel-halves rotatably mounted on opposite end portions of said pivot axle, said body having at opposite ends of said slot seats each having tapered confronting walls, each of said wheel-halves having a hub positioned generally within one of said seats, a spring normally urging said pivot axle so as to bring said hubs of the wheel-halves into wedging frictional contact with said tapered seat walls, said spring being of a strength to support its proportional share of the weight of an associated chair and being compressible under the load of a person in the chair to release said hub from said seats, said body having means mounting said body for rotation about a vertical axis which is offset from the axis of said pivot axle.

2. A castor wheel assembly according to claim 1, characterized in that said axle has a portion received within said slot of a prismatic cross section to prevent rotation of said pivot axle relative to said body.

3. A castor wheel assembly according to claim 1, characterized in that said movable axle carries a radial pin received within said spring and extending into a bore of said body which receives said spring.

4. A castor wheel assembly according to claim 1, characterized in that each wheel hub carries a braking disc cooperating with said tapered seat walls.

5. A castor wheel assembly according to claim 4, characterized in that said tapered seat walls have head projections which axially retain said braking discs and prevent said wheel-halves from movement off of said pivot axle.

6. A castor wheel assembly according to claim 5, characterized in that said head projections have a resilient yieldability so as to permit the forcible insertion of said braking discs.

* * * * *